US007559372B2

(12) United States Patent
Cobb

(10) Patent No.: US 7,559,372 B2
(45) Date of Patent: Jul. 14, 2009

(54) COMPOSITION AND PROCESS FOR ENHANCED OIL RECOVERY

(75) Inventor: Harvey G. Cobb, N. Little Rock, AR (US)

(73) Assignee: Coriba Technologies, L.L.C., Shreveport, LA (US)

( * ) Notice: Subject to any disclaimer, the term of this patent is extended or adjusted under 35 U.S.C. 154(b) by 202 days.

(21) Appl. No.: 11/103,956

(22) Filed: Apr. 12, 2005

(65) Prior Publication Data

US 2005/0224230 A1 Oct. 13, 2005

Related U.S. Application Data

(60) Provisional application No. 60/561,669, filed on Apr. 13, 2004.

(51) Int. Cl.
*E21B 43/25* (2006.01)
(52) U.S. Cl. ..................................................... 166/300
(58) Field of Classification Search .................. None
See application file for complete search history.

(56) References Cited

U.S. PATENT DOCUMENTS

| | | | |
|---|---|---|---|
| 2,718,514 A * | 9/1955 | Fantl | 525/360 |
| 3,334,688 A | 8/1967 | Blackwell et al. | |
| 3,637,017 A | 1/1972 | Gale et al. | |
| 3,902,557 A | 9/1975 | Shaughnessy et al. | |
| 3,954,627 A * | 5/1976 | Dreher et al. | 507/135 |
| 3,997,451 A * | 12/1976 | Plummer et al. | 507/259 |
| 4,357,175 A | 11/1982 | Buffington et al. | |
| 4,553,593 A | 11/1985 | Shaw et al. | |
| 4,599,117 A | 7/1986 | Luxemburg | |
| 4,634,540 A | 1/1987 | Ropp | |
| 4,813,482 A | 3/1989 | Walton et al. | |
| 4,929,341 A | 5/1990 | Thirumalachar et al. | |
| 5,042,580 A | 8/1991 | Cullick et al. | |
| 5,085,710 A | 2/1992 | Goss | |
| 5,725,802 A * | 3/1998 | Chittofrati et al. | 516/22 |
| 5,797,701 A | 8/1998 | Conaway | |
| 5,922,653 A | 7/1999 | Ahmed et al. | |
| 5,928,522 A | 7/1999 | Conaway | |

(Continued)

FOREIGN PATENT DOCUMENTS

FR 2735524 12/1996

(Continued)

OTHER PUBLICATIONS

Keller et al., A Unique, Reagent-Based, Separation Method for Tar Sands and Environmental Clean Ups, AIChE 2001 Annual Meeting, Nov. 6, 2001, Reno, Nevada, 16 pages.

(Continued)

*Primary Examiner*—Katherine W Mitchell
*Assistant Examiner*—Kerry W Leonard
(74) *Attorney, Agent, or Firm*—Bracewell & Giuliani LLP

(57) ABSTRACT

The present invention includes a cost effective custom-designed blend of organic chemicals to stimulate oil production. The invention includes a chemical composition for use in drilling operations for oil recovery and the method of using the chemical composition. The chemical composition includes an ammonia compound, an alcohol, and aqueous carrier solution. The aqueous carrier solution is of sufficient volume such that it is operable to fully dissolve the ammonia compound and alcohol in the aqueous carrier solution.

2 Claims, 2 Drawing Sheets

Injection of produced water with the chemical composition of the invention into a well.

U.S. PATENT DOCUMENTS

| | | |
|---|---|---|
| 6,096,227 A | 8/2000 | Conaway |
| 6,105,672 A | 8/2000 | Deruyter et al. |
| 6,225,263 B1 | 5/2001 | Collins et al. |
| 6,251,290 B1 | 6/2001 | Conaway |
| 6,267,893 B1 | 7/2001 | Luxemburg |
| 6,325,152 B1 | 12/2001 | Kelley et al. |
| 6,405,796 B1 | 6/2002 | Meyer et al. |
| 6,454,003 B1 | 9/2002 | Chang et al. |
| 6,543,535 B2 | 4/2003 | Converse et al. |
| 6,673,231 B2 | 1/2004 | Kim et al. |
| 2005/0224230 A1 | 10/2005 | Cobb |

FOREIGN PATENT DOCUMENTS

| | | |
|---|---|---|
| WO | WO 2005/040435 A1 | 5/2005 |
| WO | WO 2005/100745 A1 | 10/2005 |

OTHER PUBLICATIONS

EPA, A Citizen's Guide to Soil Washing, EPA 542-F-01-008, May 2001, 2 pages.

HydroPure Technologies, Inc., www.hydropuretech.com, 6 pages.

\* cited by examiner

COMPOSITION AND PROCESS FOR ENHANCED OIL RECOVERY

RELATED APPLICATIONS

This patent application claims priority to U.S. Provisional Patent Application Ser. No. 60/561,669 filed on Apr. 13, 2004, which is incorporated by reference in its entirety.

TECHNICAL FIELD OF THE INVENTION

The present invention relates to a chemical composition and the use of the chemical composition to increase oil production and reserves.

BACKGROUND OF THE INVENTION

When oil is present in subterranean rock formations such as sandstone, carbonate, or shale, the oil can generally be exploited by drilling a borehole into the oil-bearing formation and allowing existing pressure gradients to force the oil up the borehole. This process is known as primary recovery. If and when the pressure gradients are insufficient to produce oil at the desired rate, it is customary to carry out an improved recovery method to recover additional oil. This process is known as secondary recovery. Primary oil recovery followed by secondary oil recovery, such as injection of water or gas to force out additional oil, are able to remove generally around 30 percent of the total oil content of an oil reservoir in many fields.

In waterflooding, pressurized water is injected into the oil-bearing formation after primary recovery and produced from neighboring hydrocarbon production wells. First hydrocarbon, and subsequently hydrocarbon and water are recovered from the production well.

Even after secondary recovery such as waterflooding, large amounts of the original oil remain in place. The fraction of unrecoverable hydrocarbon is typically highest for heavy oils, tar, and complex formations. In large oil fields, more than a billion barrels of oil can be left after conventional waterflooding. In addition to waterflooding, carbon-dioxide-miscible flood projects are also used. Tertiary recovery then becomes the focus. It is estimated that current tertiary oil recovery techniques have the ability to remove an additional 5 to 20 percent of the oil remaining in the reservoir. Given the current world dependence on fossil hydrocarbons, the development of effective tertiary oil recovery strategies for higher oil recovery promises to have a significant economic impact. Current methods of tertiary recover are effective, but expensive. Current tertiary methods still leave significant amounts of original oil in place in the field.

Much of the remaining oil in place after primary and secondary recovery is in micro-traps due to capillary forces or adsorbed onto mineral surfaces through irreducible oil saturation as well as bypassed oil within the rock formation. Encouraging movement of normally immobile residual oil or other hydrocarbon is commonly termed tertiary recovery. It is known to use microorganisms such as bacteria to dislodge the oil in micro-traps or adsorbed onto mineral surfaces to recover additional oil during the waterflooding phase. This typically involves the introduction of a microorganism from outside. These microbes create methane, which is then recovered.

It is also know that polymers and gelled or crosslinked water-soluble polymers are useful in enhanced oil recovery and other oil field operations. They have been used to alter the permeability of underground formations in order to enhance the effectiveness of water flooding operations. Generally, polymers or polymers along with a gelling agent such as an appropriate crosslinking agent in a liquid are injected into the formation. Both microbe-based and polymer-based enhanced recovery are expensive processes.

The diagenetic fabrics and porosity types found in various hydrocarbon-bearing rocks can indicate reservoir flow capacity, storage capacity and potential for water or CO2 flooding. The goal is to force oil out of high-storage-capacity but low-recovery units into a higher recovery unit. This allows an increase of recovery of oil over predicted primary depletion recovery such that a higher percentage of the original oil in place is recovered.

Traditional tertiary recovery operations include injection of the CO2 or water into the well. There is a need for an improved composition for enhanced oil recovery. It would be advantageous to use commercially available traditional injection facilities to reduce capital expenditures.

To fully capitalize on their national resources, oil-producing countries must enhance domestic petroleum production through the use of advanced-oil recovery technology. Operating companies, typically conservative in stating recoverable reserves, have a need to increase recoverable reserves from proven reserves as opposed to development of unproven reserves. There is a need for cost effective oil recovery techniques to maximize removal of original oil in place per field. There is a need for a cost effective oil recovery technique to reduce development costs by more closely delineating minimum field size and other parameters necessary to successfully recover oil. There is a need for tertiary recovery that can utilize simple or current application procedures.

U.S. Pat. No. 6,225,263 teaches a method of increasing the recovery of oil and/or gas from an underground formation by injecting into the formation an aqueous solution of a mono alkyl ether of polyethylene glycol.

U.S. Pat. No. 3,902,557 describes a method of treating the formation surrounding a well by injection of a solvent including a $C_4$ to $C_{10}$ alkyl ether of a polyglycol ether containing a $C_4$ to $C_{10}$ alkyl ether of a polyglycol ether containing 10-22 carbon atoms per molecule. $C_4$ to $C_8$ monoalkyl ethers of tri and tetra ethylene glycols are preferred in particular the hexyl ether while the butyl ether is also mentioned. The solvent may be diluted with an organic liquid such as alcohol, e.g. isopropanol.

FR Patent No 2735524 is directed toward a method of secondary and tertiary recovery through the use of alcohol in an amount of 1 to 5% by weight to solvate asphaltenes.

A need exists for a cost effective composition and method of use of the composition to improve enhanced oil recovery. There is a need to capitalize on the original oil in place that is unrecovered by primary and/or secondary recovery method.

SUMMARY OF THE INVENTION

In order to meet one or more of these needs, the present invention advantageously provides a composition and method for tertiary oil recovery. The invention includes a cost effective custom-designed blend of organic chemicals to stimulate oil production. Whether through surfactant or solvent action, this composition mobilizes residual oil trapped in the reservoir.

The invention includes a chemical composition for use in drilling operations for oil recovery and the method of using the chemical composition. The chemical composition includes an ammonia compound, an alcohol, and aqueous carrier solution. The aqueous carrier solution is of sufficient volume such that it is operable to fully dissolve the ammonia compound and alcohol in the aqueous carrier solution. While heating is not required, slight elevation of the temperature has shown positive effects. The chemical composition exhibits the ammonia compound and the alcohol substantially distributed throughout the carrier fluid.

In a preferred embodiment, the alcohol useful in the chemical composition of the invention contains from about one to about six carbon atoms. The alcohol is preferably non-aromatic. More particularly, alcohols containing one to four carbons are particularly useful, i.e. methyl, ethyl, propyl, and/or buytl alcohol. Of the propyl alcohols, isopropyl alcohol is particularly preferred. Alcohol is preferred in an amount of approximately 4 to 16 percent by volume of the chemical composition.

In the chemical composition of the invention, a preferred carrier solution is water. This solution can also be salt water such as produced waters. Aqueous carrier solutions are preferred. In a preferred embodiment, there is only one carrier solution and it is just water. The carrier solution in an amount of approximately 76 to 94 percent by volume of the chemical composition is preferred.

The ammonia compound of the chemical composition is preferably ammonia or ammonium hydroxide. The ammonia compound present in an amount of approximately 2 to 8 percent by volume of the chemical composition.

The preferred amounts of the ammonia compound and the alcohol define a range of ratios that are preferred. The preferred ratio of alcohol to ammonia compound is between approximately 1:1 alcohol to ammonia and approximately 3:1 alcohol to ammonia, the ratio being on a volume basis. The ratio of approximately 2:1 alcohol to ammonia is particularly preferred.

This invention also includes a process for recovering hydrocarbons from a hydrocarbon formation containing hydrocarbon reserves. The process of the invention includes introducing the chemical composition into the hydrocarbon formation in an amount effective to substantially increase the recovery of hydrocarbons from the formation. The subsequent recovery of hydrocarbons from the hydrocarbon formation can be through the same well or through other wells in the field.

The current invention can be used as secondary and/or tertiary recovery. The composition of the invention is believed to improve the permeability of the formation adjacent to the well bore.

BRIEF DESCRIPTION OF THE DRAWINGS

So that the manner in which the features, advantages and objects of the invention, as well as others that will become apparent, may be understood in more detail, more particular description of the invention briefly summarized above may be had by reference to the embodiment thereof that are illustrated in the appended drawings, which form a part of this specification. It is to be noted, however, that the drawings illustrate only a preferred embodiment of the invention and are therefore not to be considered limiting of the invention's scope as it may admit to other equally effective embodiments.

DETAILED DESCRIPTION

Figure 1:
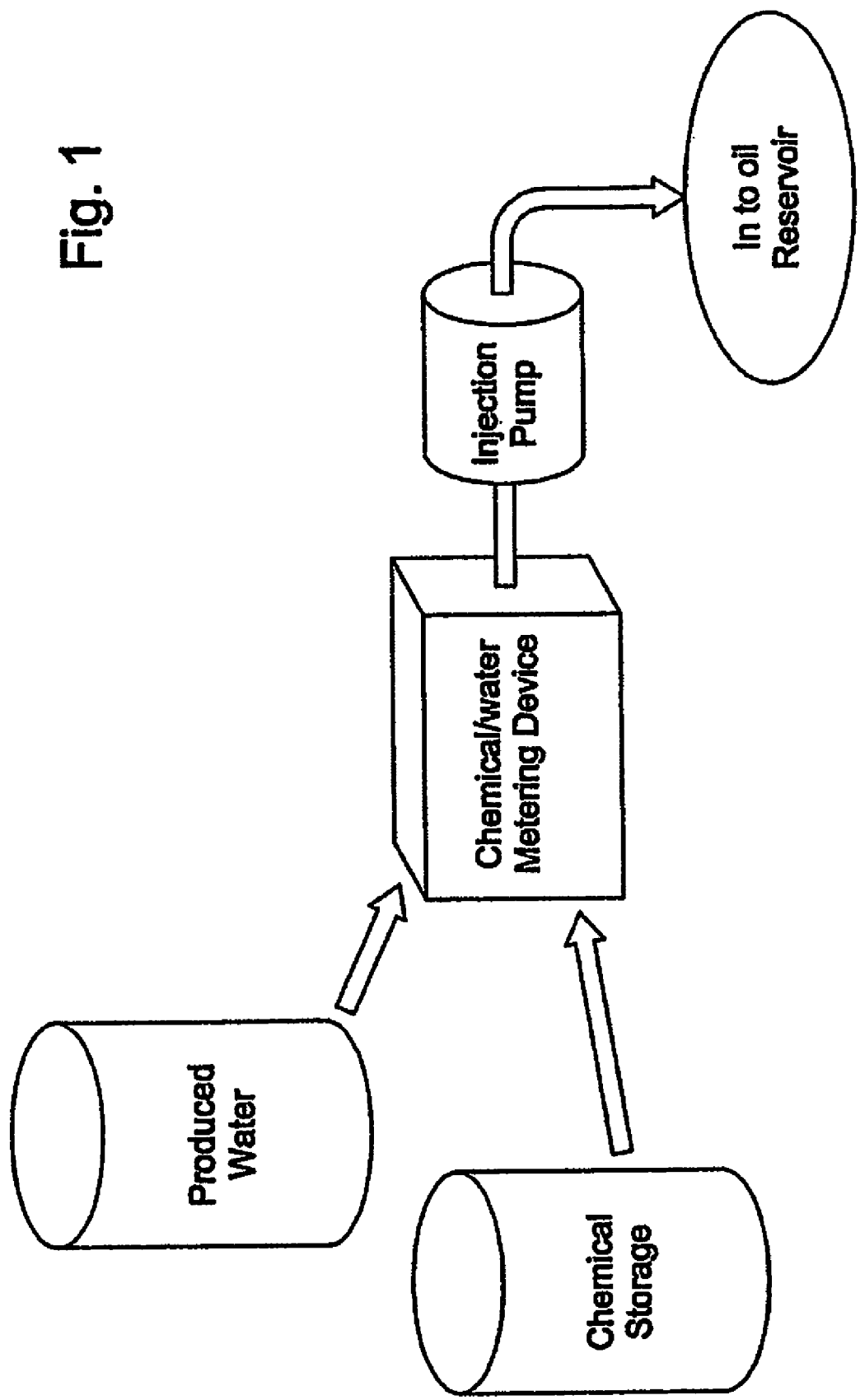
FIG. 1 is a simplified flow diagram of injection of the chemical compound of the invention into a reservoir.
Figure 2:
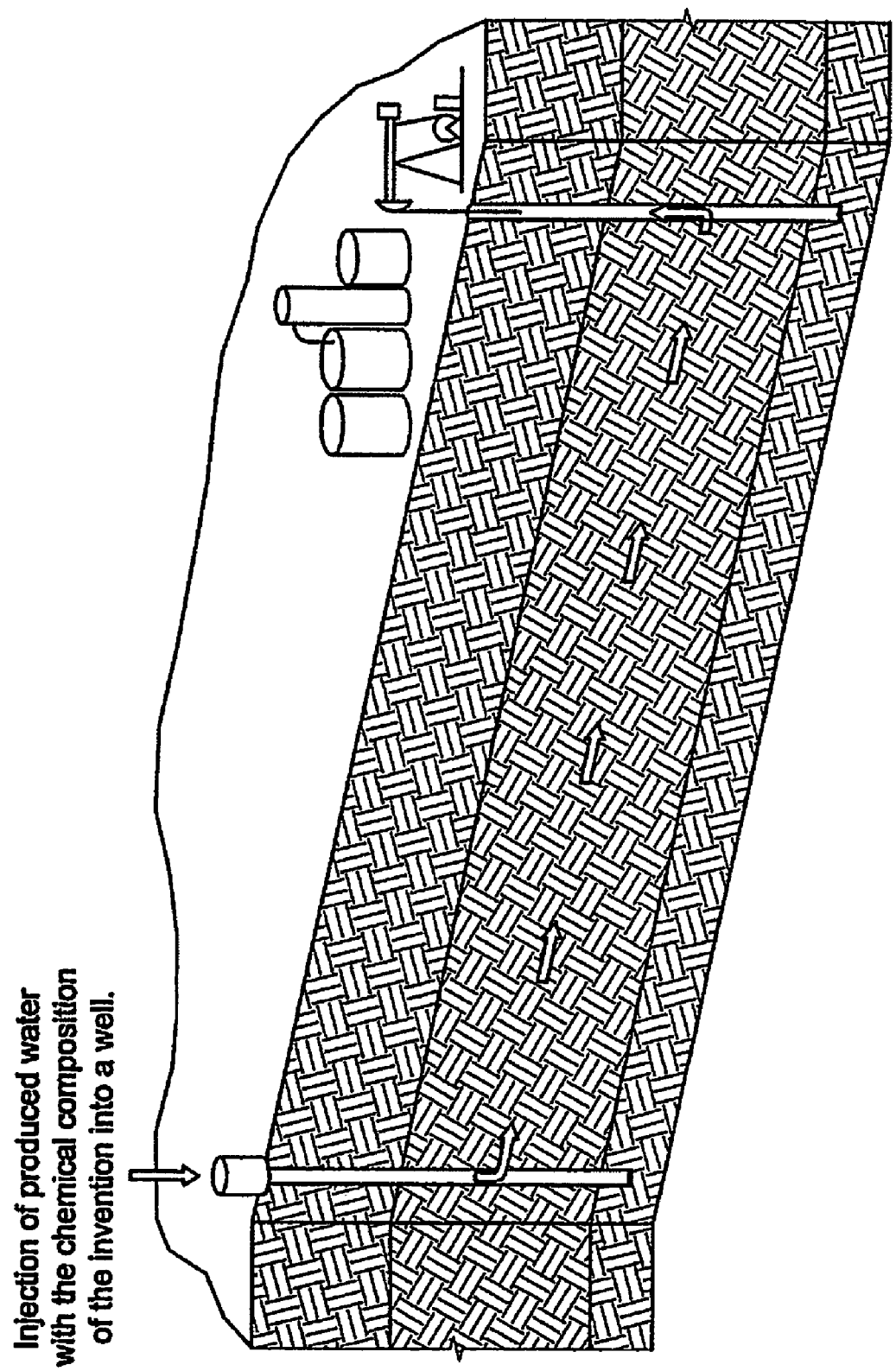
FIG. 2 is a simplified flow diagram of equipment useful for one embodiment of the invention that includes injecting produced water with the chemical composition of the invention into a well

For simplification of the drawings, figure numbers are the same in FIG. 1 and FIG. 2 for various streams and equipment when the functions are the same, with respect to the streams or equipment, in each of the figures. Like numbers refer to like elements throughout, and prime, double prime, and triple prime notation, where used, generally indicate similar elements in alternative embodiments.

Alcohols can generally be defined as R—OH where R is a combination of carbon and hydrogen atoms, water being excluded from such definition. The preferred alcohol of the invention is straight chained, as opposed to an aromatic, with a continuous chain of carbon atoms from 1 to 8 carbons long. Saturated alcohols are generally preferred as they tend to be more stable than unsaturated alcohols. Methyl alcohol, ethyl alcohol, i-propyl alcohol, n-propyl alcohol and butyl alcohol are preferred. Propyl alcohol is particularly preferred. Of the propyl alcohols, isopropyl alcohol is particularly preferred. Mixtures of methyl, ethyl, propyl and/or butyl alcohols to create the alcohol of the invention are also encompassed in this invention. A mixture of ethyl and propyl alcohol is preferred. As the chemistry of the alcohol molecule is dominated by the functional OH group, it is understood by those skilled in the art that other alcohols can be effective alone or in combination. However, the use of only one alcohol having a continuous chain of 1 to 8 carbons or only one alcohol, that alcohol being the mixture of the one to eight carbon alcohols without other alcohols, is effective and preferred.

Notably, alcohols can also be created in situ, for example, through the reaction of salts with appropriate reagents in the presence of water. Creation of the alcohol in situ is also encompassed in this invention.

Additionally, surfactants can be added to the chemical composition in order to decrease the water-oil interfacial tension and to improve the efficiency, but the invention provides efficient and cost-effective results through the use of a mixture of only the ammonia compound, the alcohol and the carrier solution.

Ammonia is added to the chemical composition. Ammonia can be provided in many forms, the preferred forms being anhydrous ammonia and ammonium hydroxide. Ammonia can be produced by reaction or dissociation. Ammonium ions such as dissolved ammonium salts are also encompassed within the invention. Ammonia is quite soluble in water, dissolving to the extent of about 700 volumes in 1 volume of solvent. The dissolving process is accompanied by the reaction NH3+H2O thereby producing NH4++OH—. This is referred to as ammonium hydroxide. Therefore, ammonium hydroxide, which is often produced commercially with significant amounts of ammonia in water, is included in the term ammonia in this invention. Also encompassed are other precursors that form the ammonium ion in situ.

Isopropyl alcohol, also known as isopropanol, has a formula of $C_3H_8O$ and is unsaturated. This is a particularly preferred alcohol of the invention. It is noted that isopropyl alcohol has a boiling point of 82.4 degrees C. and specific gravity: 0.78 at 20 degrees C. The air odor threshold concentration of isopropyl alcohol to be as 22 parts per million (ppm) parts of air. Contact between isopropyl alcohol and air occasionally results in the formation of peroxides, another possible element of the composition, whether added or created in situ. Therefore, an alternate embodiment of the invention includes the addition of peroxide to the ammonia compound and alcohol. Isopropyl alcohol is believed to change the wettability of the strata, particularly at the interface of the fracture and rock matrix. Viscocification is achieved by altering the properties of the reservoir fluid.

EXAMPLE 1

Anhydrous ammonia is used in this example, Baume 26.

|  | isopropyl alcohol | anhydrous ammonia | water |
|---|---|---|---|
| volume % | 8 | 4 | 88 |

The resulting composition was diluted five times such that there was 1 part composition of the invention and 4 parts diluent. Water was used as the diluent. Salt water from produced waters can also be used. This was tested on well and substantially increased recovery was observed.

EXAMPLE 2

Test is identified as test #1300. Following is a chart comparing the chemical composition of the invention to connate water:

| #1300 | Surface Viscosity mPa·s | Density g/cm3 | pH |
|---|---|---|---|
| Chemical | 0.79 | 0.958 | 11.635 |
| Connate water #1 | 0.83 | 0.985 | 9.439 |
| Connate water #2 | 0.78 | 0.982 | 9.362 |

This example was run at concentration of 0% (to mimic connate water), 0.2%, 0.5%, 1.0%, 2.0%, 4.0%, 6.0%, 8.0%, 10%, 15%, 20% and 100%.

The results of these tests indicate that the solubility of the chemical composition is good in different concentration.

EXAMPLE 3

Test is identified as test #700. Following is a chart comparing the chemical composition of the invention to connate water:

| #700 | Surface Viscosity mPa·s | Density g/cm3 | pH |
|---|---|---|---|
| Chemical | 0.83 | 0.964 | 11.791 |
| Connate water #1 | 0.83 | 0.985 | 9.439 |
| Connate water #2 | 0.78 | 0.982 | 9.362 |

The chemical can be recovered and recycled to further decrease costs. The chemical composition does not appear to react with oil nor is a significant amount trapped in the formation. Therefore, the chemical composition can be separated from oil/fluid and recycled.

While the invention has been shown or described in only some of its forms, it should be apparent to those skilled in the art that it is not so limited, but is susceptible to various changes without departing from the scope of the invention.

For example, while this invention has been described as useful for tertiary recovery, it can be used to stimulate production at any point during the life of the well, including in conjunction with secondary flooding. While traditional injection equipment has been described, the invention includes any method of bringing the chemical composition into contact with the oil producing strata. Various means of forming the chemical composition, including creation in situ, are encompassed in this invention. Uses for the chemical composition related to the properties recognized in the composition are also encompassed within this invention. The method of the invention may be applied to well stimulation treatments such as water blocking, sand consolidation, sandstone acidizing and methods of increasing the recovery of oil such as tertiary oil recovery. The chemical composition can be injected into a producing well or at a distance from a producing well to drive the hydrocarbons to the well. Gelled or viscosified means of delivering this chemical composition are also encompassed in the invention.

What is claimed:

1. A process for recovering hydrocarbons from a hydrocarbon formation containing hydrocarbon reserves, the process comprising the steps of:

introducing a chemical composition into the hydrocarbon formation in an amount effective to, when added to the formation, substantially increase the recovery of hydrocarbons from the reserve, the chemical composition comprising:

an ammonia compound, an alcohol wherein the alcohol is butyl alcohol; and an aqueous carrier solution, the aqueous carrier solution being of sufficient volume operable to fully dissolve the ammonia compound and alcohol in the aqueous carrier solution, the ammonia compound and the alcohol being substantially distributed throughout the carrier fluid, the chemical composition having an absence of surfactant; and recovering hydrocarbons from the hydrocarbon formation.

2. A process for recovering hydrocarbons from a hydrocarbon formation containing hydrocarbon reserves, the process comprising the steps of:

introducing the chemical composition of claim 1 into the hydrocarbon formation in an amount effective to, when added to the formation, substantially increase the recovery of hydrocarbons from the reserve;

recovering a significant amount of the chemical composition subsequent to the introduction of the chemical composition into the hydrocarbon formation such that the chemical composition can be used again in the hydrocarbon formation; and recovering hydrocarbons from the hydrocarbon formation.

* * * * *